Feb. 20, 1951 K. O. I. STYRÉN 2,542,592
AUDIO-FREQUENCY SIGNALING SYSTEM
Filed Jan. 26, 1949
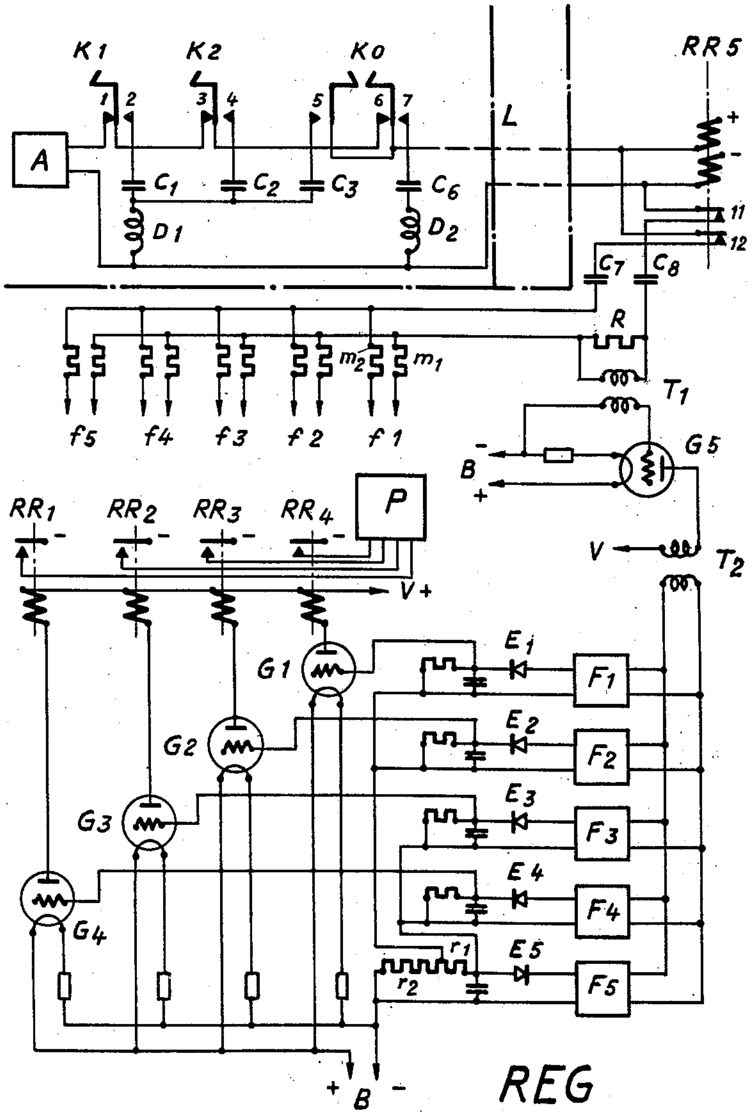
REG
Inventor
K. O. I. Styrén
By Glascock Downing Seebold
Attys.

Patented Feb. 20, 1951

2,542,592

UNITED STATES PATENT OFFICE 2,542,592

AUDIO-FREQUENCY SIGNALING SYSTEM

Knut Olof Ivar Styrén, Malarhojden, Sweden, assignor to Telefonaktiebolaget L M Ericsson, Stockholm, Sweden, a company of Sweden Application January 26, 1949, Serial No. 72,971
In Sweden February 5, 1948

1 Claim. (Cl. 177—353)

The present invention refers to automatic telephone systems by which signals are transmitted over a subscriber's line to actuate receiving devices arranged at a telephone exchange, which signals are produced by a number of audio-frequency currents of different frequencies which are emitted from said telephone exchange and are allowed to pass or are prevented from passing over the line through resonance circuits connected to the line during said signals at the subscriber's station with the help of a key set, each of said frequencies actuating one of said receiving devices.

In similar known telephone systems, the possibility of transmitting the signals is limited by the capacity of the line and the impedance of the subscriber's instrument. In the case of long cable lines, the increase or decrease of the amplitude of the currents upon connection of the resonance circuits is far too small to be registered with accuracy by the receiving devices at the telephone exchange.

The object of the present invention is to overcome said difficulty and to neutralize the effect of the capacity of the line and the impedance of the subscriber's instrument on the receiving devices for the signals. A feature of the invention is that each of said receiving device is operated by two audio-frequency currents, the effects of which counteract each other. Another feature of the invention is a system for connecting all of the frequency generators and receiving devices simultaneously to the line each time a signal is set, and disconnecting the subscriber's instrument when the generators and the receiving devices are connected in.

The invention will be described more closely with reference to the accompanying drawings, whose single figure is a schematic diagram of the invention.

In the drawing, A is a subscriber's instrument, to which pertains a key set with a number of keys of which three keys K1, K2 and K0 are shown in the drawing. Upon initiation of a call, the subscriber's instrument A is connected with a register REG at the exchange. Thereupon the line circuit is closed over the subscriber's instrument and the contacts 1, 3 and 6 in the key-set. Relay RR5 in the register is operated, when line L is closed. Five audio-frequency generators with the frequencies f1—f5 are connected to the contacts 11 and 12 over the condensers C7 and C8 and two series resistances for each one of the generators, e. g. m1 and m2 for the generator with frequency f1, so that all of said generators will be connected to line L over contacts 11 and 12 whenever relay RR5 is deenergized by an opening of the line at the keys of the key set. The audio-frequencies pass a common impedance R.

Each time a key in the key-set is pushed down, the current is broken for relay RR5, which thereby releases its armature. All the generators are connected across the line L and one or two of the audio-frequencies are allowed to pass over the line through resonance circuits composed of one of the condensers C1—C6 and one of the choke coils D1—D2. If the key K1 is pushed down the frequency f1 is allowed to pass through the resistances m1 and m2. the primary winding of the transformer T1 with the parallel resistance R, the condensers C7 and C8, the contacts 11 and 12, the line L and the choke coil D1 and condenser C1. If the key K0 is pressed down, the frequencies f3 and f4 are allowed to pass through choke coil D1 and condenser C3, respectively choke coil D2 and condenser C6. However, all the frequencies f1 to f5 can and do pass over the capacitance of the line. The audio-frequency currents passing over line L produce a voltage drop in the impedance R, which is applied over a transformer T1 to the grid of an amplifying tube G5 connected to an anode battery V, and a filament current battery B. The anode current through tube G5 is transformed and carried through transformer T2 to five resonance circuits F1—F5, one for each of the audio-frequencies f1—f5. Each one of the audio-frequency currents passing through the resonance circuits F1—F5 is rectified in a rectifying device E1—E5 and supplied to a resistance connected in parallel with a condenser. The voltage drop across each said resistance for the frequencies f1—f4 together with the voltage drop over a corresponding resistance r1, r2 for the frequency f5 is supplied to the grid on each of the tubes G1—G4. The rectifying device E5 gives a voltage over the resistances r1 and r2, which tends to counteract the voltages coming from the rectifying devices E1—E4. The resulting grid voltages on tubes G1—G4 remain substantially unchanged if the line L is connected over the contacts 11 and 12 to the audio-frequency generators without said line L being closed over a resonance circuit controlled by the key set and tuned for one of the frequencies, since the line capacity allows about as strong audio-frequency currents from all the generators to pass. When a signal is to be emitted, the line is closed over a resonance circuit, which allows one of the frequencies to pass but substantially stops the others. A change of the grid voltage on the tube corresponding to said frequency thereby takes place, and at least one relay RR1—RR4 connected in its anode circuit attracts its armature and closes contacts, which cause a registering of the signal in a registering device P in the figure.

If e. g. the key K0 is pushed down, the current for relay RR5 is broken and two frequencies, e. g. f3 and f4, are allowed to pass over the line, one through the choke coil D1 and the condenser C3, and the other through the choke coil D2 and the condenser C6. Relays RR3 and RR4 in the register are thereby operated and the registering device P registers a signal corresponding to a combination of the frequencies f3 and f4.

In the drawing, it is supposed that the frequency f5 is higher than the others. Since a higher frequency passes the line capacity easier than a low one, the voltage over resistances r1+r2 will be unnecessarily high as compared with that for the lower frequencies, f1 and f2. The resistance is therefore divided and only the voltage over resistance portion r2 is taken to the tubes G1 and G2. If a greater accuracy is wanted, further terminals can be provided on the resistance connected to the rectifying device E5.

I claim:

An automatic telephone system including a subscriber's station having a telephone instrument, a central office, a line interconnecting said station and said central office, a plurality of sources of alternating currents of different frequencies and a plurality of signal receiving devices at said central office each responsive to one of said frequencies, a key set and a plurality of resonant circuits at said station, connections between said line, said key set and said circuits arranged to break said line upon the operation of each key and simultaneously to connect across said line at least one of said circuits corresponding to said key, a relay and a source of direct current at said central office, connected to supply direct current to said line through the coil of said relay, contacts on said relay connected to said line and to said sources of alternating currents to connect the latter to said line upon the breaking of said line at the subscriber's station by operation of said keys, means for conducting energy passing from said sources and over said line through said resonant circuits to said signal receiving devices, and means for simultaneously applying to said signal receiving devices energy at the frequency of a predetermined one of said sources in opposition to the energy conducted to said devices at the frequencies selected by said key set.

KNUT OLOF IVAR STYRÉN.

REFERENCES CITED

The following references are of record in the file of this patent:

UNITED STATES PATENTS

| Number | Name | Date |
|---|---|---|
| 2,039,404 | Green et al. | May 4, 1936 |
| 2,379,614 | Tunick | July 3, 1945 |
| 2,424,961 | Bancroft et al. | Aug. 5, 1947 |